(12) United States Patent
Denning et al.

(10) Patent No.: US 7,180,268 B2
(45) Date of Patent: Feb. 20, 2007

(54) CIRCUITS CAPABLE OF TRICKLE PRECHARGE AND/OR TRICKLE DISCHARGE

(75) Inventors: Bruce S. Denning, Monterey, CA (US); Guoxing Li, Sunnyvale, CA (US); Liusheng Liu, San Jose, CA (US)

(73) Assignee: O2Micro International Limited, Grand Cayman (KY)

( * ) Notice: Subject to any disclaimer, the term of this patent is extended or adjusted under 35 U.S.C. 154(b) by 222 days.

(21) Appl. No.: 10/832,621

(22) Filed: Apr. 27, 2004

(65) Prior Publication Data

US 2005/0212484 A1  Sep. 29, 2005

Related U.S. Application Data

(60) Provisional application No. 60/556,254, filed on Mar. 25, 2004.

(51) Int. Cl.
*H01M 10/44* (2006.01)
*H01M 10/46* (2006.01)
(52) U.S. Cl. ..................................... 320/134
(58) Field of Classification Search ............... 320/134, 320/135, 136, 158, 108
See application file for complete search history.

(56) References Cited

U.S. PATENT DOCUMENTS

| 5,903,702 A * | 5/1999 | Sugiyama et al. .......... 320/112 |
| 6,407,538 B1 * | 6/2002 | Kinoshita et al. ........... 323/314 |
| 6,844,702 B2 * | 1/2005 | Giannopoulos et al. ..... 320/108 |

OTHER PUBLICATIONS

English translation of Preliminary Notice of Rejection issued May 26, 2006 recieved in corresponding Taiwan Patent Application (3 pages).

\* cited by examiner

*Primary Examiner*—Edward H. Tso
(74) *Attorney, Agent, or Firm*—Grossman, Tucker, Perreault & Pfleger, PLLC (57) ABSTRACT

Battery charging circuitry and systems are provided. One embodiment may include at least one switch having a full conduction state and a controllable conduction state and switch control circuitry capable of sensing a condition. The switch control circuitry may further be capable of generating at least one control signal capable of controlling the conduction state of the switch based on, at least in part, the sensed condition.

15 Claims, 9 Drawing Sheets

FIG. 2B MODIFIED FOR TRICKLE DISCHARGE

FIG. 3A

FIG. 3B MODIFIED FOR TRICKLE DISCHARGE

FIG. 4

FIG. 5 N BITS PROGRAMMABLE REFERENCE CURRENT SOURCE

FIG. 6

CIRCUITS CAPABLE OF TRICKLE PRECHARGE AND/OR TRICKLE DISCHARGE

The present application claims priority to U.S. Provisional Application Ser. No. 60/556,254, filed Mar. 25, 2004, and hereby incorporated by reference in its entirety.

1. FIELD OF THE INVENTION

The present disclosure relates to battery charging circuits, and more particularly, to battery charging circuits capable of trickle precharge and/or trickle discharge. Utility for the present invention can be found in battery charging systems for portable electronic devices, for example, laptop computers, PDAs, cell phones, and/or any type of electronic device having a rechargeable battery.

2. BACKGROUND OF THE INVENTION

Rechargeable batteries, especially lithium ion batteries, need to precharge (recovery-charge) from deeply discharged status to avoid stressing the depleted batteries. When a rechargeable battery is deeply discharged and its cell voltage lower than a threshold voltage $V_{UV}$, it cannot be directly charged using large charging current. Instead, a pre-charge mode is needed. In pre-charged mode, a small charging current is used, until the battery voltage is charged larger than the voltage $V_{UV}$, then it can be charged in normal mode, i.e. charging by larger charging current. For lithium ion battery, the threshold voltage $V_{UV}$ is approximately 2.4V~3.0V for one cell, depending on battery type and manufacturer. The pre-charging current is about 10 mA~100 mA. However, the normal charge current can be a few hundred milli-Amperes to 1 Ampere depending on the battery capacity.

Figure 1A:
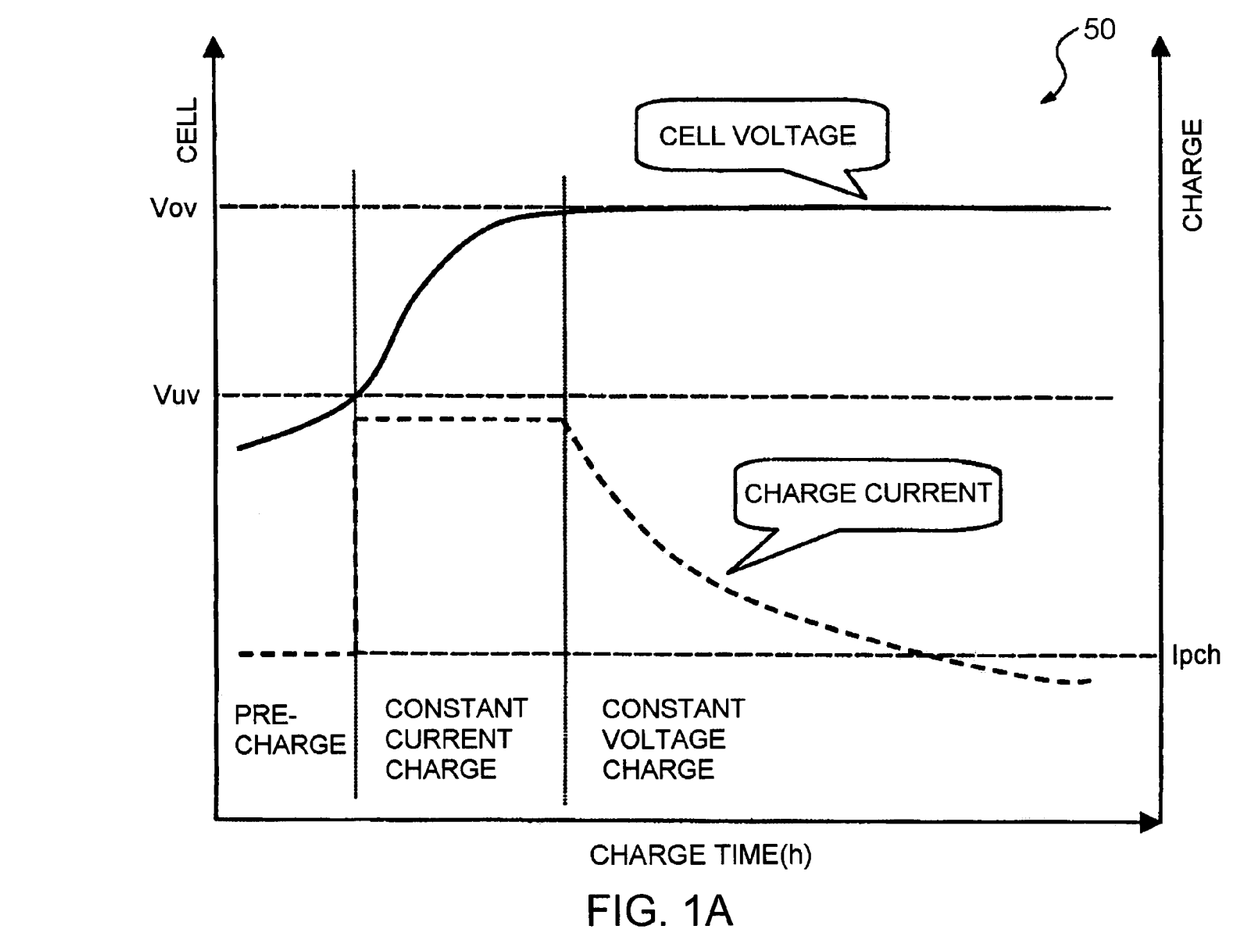
FIG. 1A is graphical representation of a typical charging profile for a LiIon battery.

FIG. 1A depicts the charging profile 50 for a lithium ion rechargeable battery. When the battery voltage is higher than $V_{UV}$, the battery enters into constant current (CC) charging mode, and a large constant current is used to charge the battery (the battery voltage also increases as the battery capacity increases). When the battery voltage increases to $V_{OV}$, which represents overvoltage (normally around 4.2V for a LiIon battery), the battery enters into constant voltage (CV) charging mode. In this mode, the charger holds the voltage at $V_{OV}$. When the charging current decreases to a predetermined minimum value, for example 50 mA, the charge procedure is stopped. During the CV charge mode, the charger must regulate the voltage precisely to $V_{OV}$ (to within +/−0.005 V), otherwise the charging current will not taper off with increasing battery capacity. If, for example, the charging output is larger than $V_{OV}$ then over-charging the battery may occur, which may present safety issues with LiIon batteries.

Figure 1B:
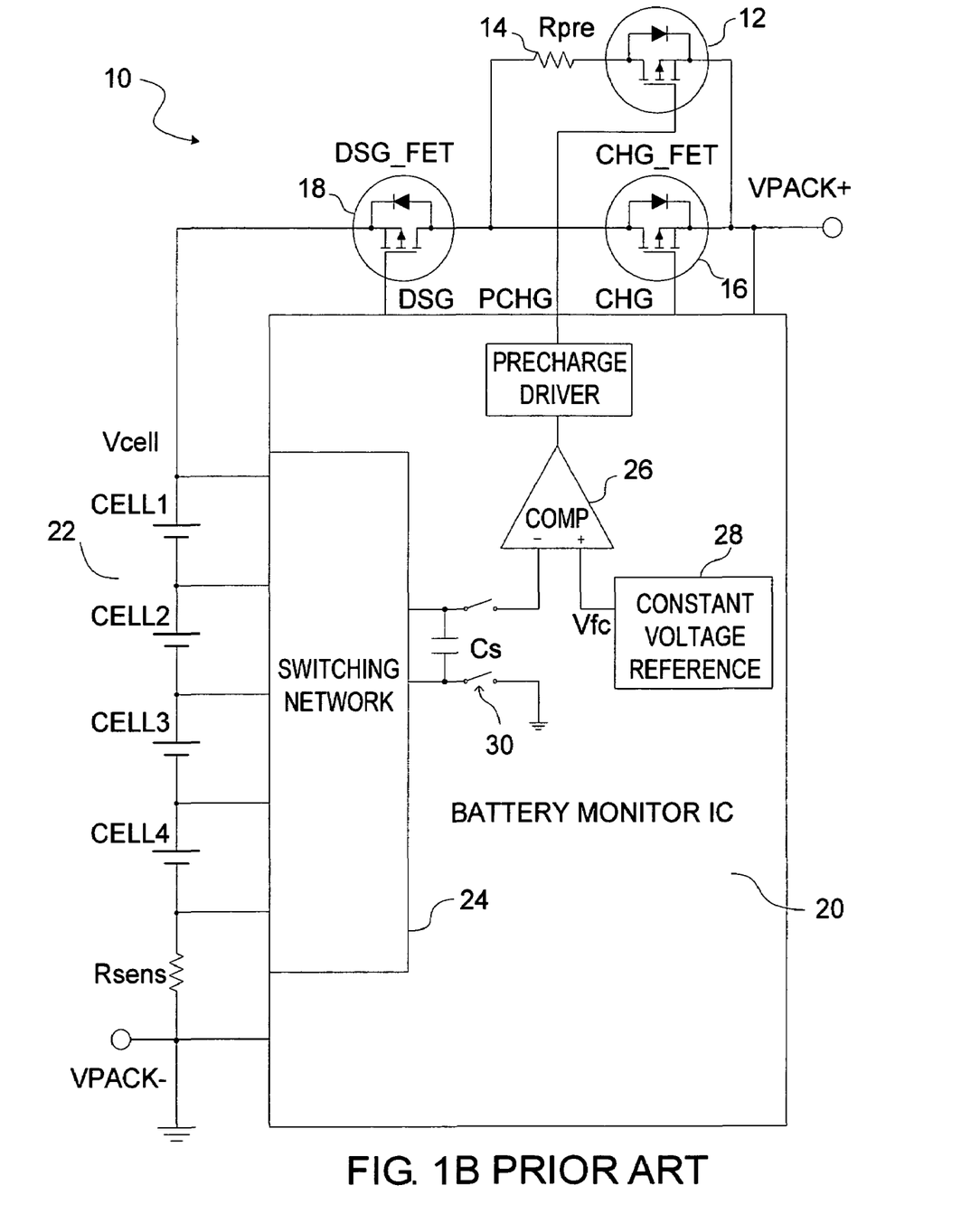
FIG. 1B is a conventional battery precharge circuit.

The conventional circuit 10 to implement precharging is shown in FIG. 1B. A precharge MOSFET 12 in series with a resistor 14 are used for precharging. At the time of precharging, charging FET 16 turns off and precharging FET 12 turns on. Therefore, the precharging current is approximately determined by the voltage difference between charger input voltage VPACK+ and total cell voltage Vcell, VPACK+−Vcell, divided by the serial resistor 14 Rpre. When the AC adapter is present and VPACK+ is higher than the cell voltage Vcell, the charging or precharging will start based on the initial voltage of each cell. If the voltage in any cell is lower than the threshold $V_{UV}$, the battery pack will be in the precharging mode. Otherwise normal charging will be taken.

Those skilled in the art will recognize that the circuit 10 of FIG. 1B includes a battery monitor IC 20 that includes circuitry to monitor voltage and current conditions on each of the cells (Cell1, Cell2 . . . Cell4) of the battery pack 22. Such circuitry may include a switching network 24 to sample each cell voltage. To control the operation of the precharge MOSFET 12, the conventional circuit 10 includes a comparator 26 that compares a constant reference voltage 28 ($V_{UV}$) with the voltage across each cell, via switches 30.

However, one drawback of the topology depicted in FIG. 1B is that an extra power MOSFET (i.e., MOSFET 12) and resistor 14 are required, which are expensive and increase PCB area. Additionally, with this topology, the lower the cell voltage results in a larger precharging current. Also, precharging current decreases with the increasing of cell voltage, which translates into longer time to finish precharging.

Additionally, the value of the resistor 14 is typically fixed, and the maximum and minimum precharge current is also typically fixed, and cannot be adjusted to accommodate different battery pack requirements.

BRIEF DESCRIPTION OF THE DRAWINGS

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein.

DETAILED DESCRIPTION

Figure 2A:
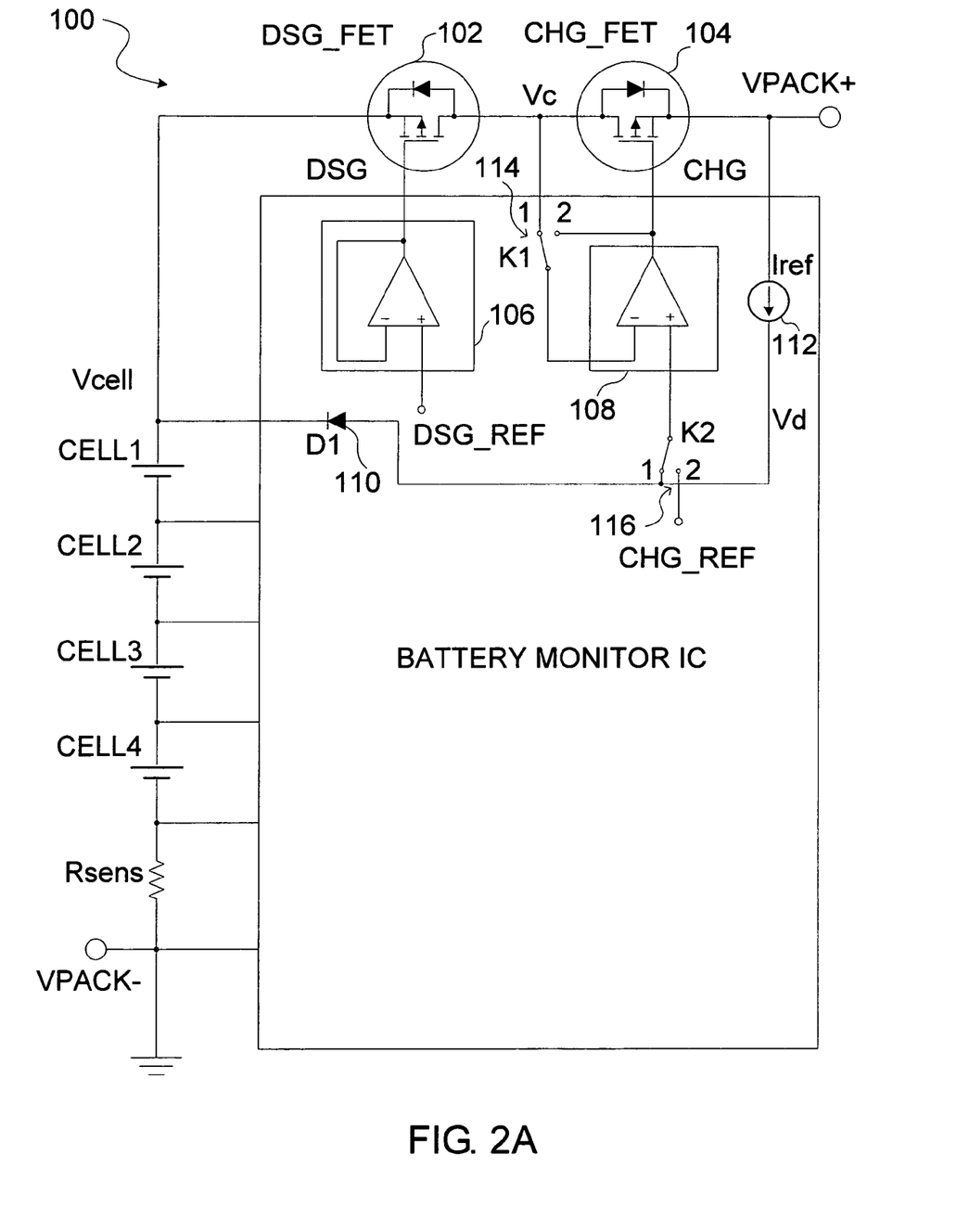
FIG. 2A is one exemplary trickle precharge topology according to the present invention.

FIG. 2A depicts one exemplary trickle precharge topology 100 according to the present invention. In this embodiment, two FETs (charge FET CHG_FET and discharge FET DSG_FET) may be used. In this embodiment, the charge FET 104 and discharge FET 102 may be placed back-to-back in series in the manner depicted and as understood in the art. In a trickle precharge mode, the discharge FET 102 may be off (non-conducting), but current may still pass through its body diode to the battery cells if charge FET (CHG_FET) is on (conducting). If CHG_FET is off, then no current flows from or into the battery cells.

Besides two MOSFETs, this topology 100 may also include a reference diode D1 110, discharge driver 106, charger driver 108, and reference current source Iref 112. The charge driver 108 and discharge driver 106 may each comprise respective comparators. In a regular charge mode, switches K1 and K2 (114 and 116) are set to position 2. In this position, the charge driving voltage CHG is driven to a point approximately equal to a relative reference voltage CHG-REF, which operates to fully turn on the charge FET 104. Therefore, the reference voltage CHG-REF is selected in accordance with the turn on requirements of the charge FET device 104.

In a trickle precharge mode, switches K1 and K2 may be set to position 1. When an AC adapter is applied, VPACK+ voltage may rise. The charge FET 104 may be driven into saturation by the charge driver 108, which may mean that the charge FET 104 acts as a variable resistance, and a trickle charge may flow through the switch 104. The charge driver 108 may be adapted to regulate the charge FET (CHG_FET) 104 to force the voltage Vc equal to Vd, which may be set by diode D1 110 and reference current source Iref 112.

Vc is derived as the voltage between the switches. Vc may be set as the input to the (−) terminal of the comparator, while Vd (set by Iref and D1) may be set as the input to the (+) terminal. The output signal CHG is Vd−Vc. While Vc may be approximately equal to Vd, the gain of the amplifier may be selected such that a large output signal is produced sufficient to cause the charge FET to operate in saturation region. Thus, the charger driver 108 may be adapted to operate during the trickle precharge period to compare a fixed signal (Vd) with Vc.

In forward bias condition, the diode D1 DC current is given by:

$$Iref = A1*IS1*(exp(Vd1/Vt)-1)$$

where A1 is diode D1 junction area, IS1 is diode D1 unit reverse saturation current, Vd1=Vd−Vcell is the voltage drop across the diode D1, and Vt is diode threshold voltage.

The DC current in the body diode of discharge FET 102 is given by:

$$Ipch = A2*IS2*(exp(Vd2/Vt)-1)$$

where A2 is the body diode junction area, IS2 is the body diode unit reverse saturation current Vd2=Vc−Vcell is the voltage drop across discharge FET body diode.

IS1 and IS2 are determined by the type of semiconductor device chosen, as is well understood in the art.

If Vd and Vc are forced to be substantially equal, then the trickle precharge current is proportional to the reference current Iref, and is given by:

$$Ipch = A2/A1*(IS2/IS1)*Iref.$$

Preferably, although not required by the present invention, the junction area A2 of the body diode of the charge and discharge FETs is typically large because of low turn-on resistance and high current requirement, while the junction area A1 of diode D1 is very small in order to save die area. Therefore, a small current Iref (tens of micro-amper) can be used to control larger current Ipch (tens to hundreds of milli-amper), since A2>>A1.

Figure 2B:
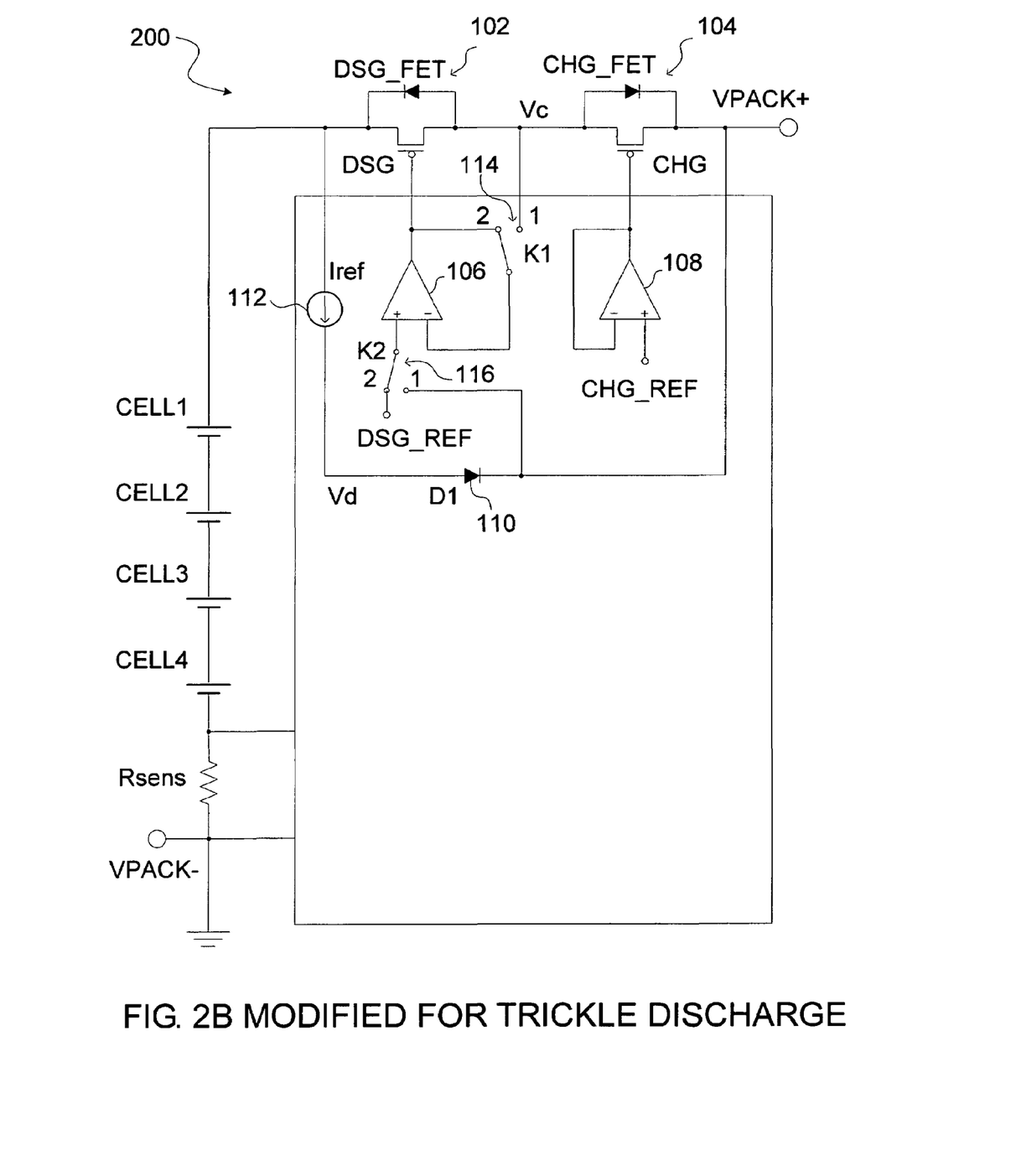
FIG. 2B is one exemplary trickle discharge topology according to the present invention.

FIG. 2B depicts one exemplary trickle discharge topology 200 according to the present invention. This embodiment is similar to the topology 100 depicted in FIG. 2A, except the reference current source 112 and the diode 110 are coupled on the discharge MOSFET 102. During a trickle discharge period the charge MOSFET 104 may be OFF, and discharge current flows through its body diode. The operation of the topology 200 is otherwise described above with reference to FIG. 2A.

Figure 3A:
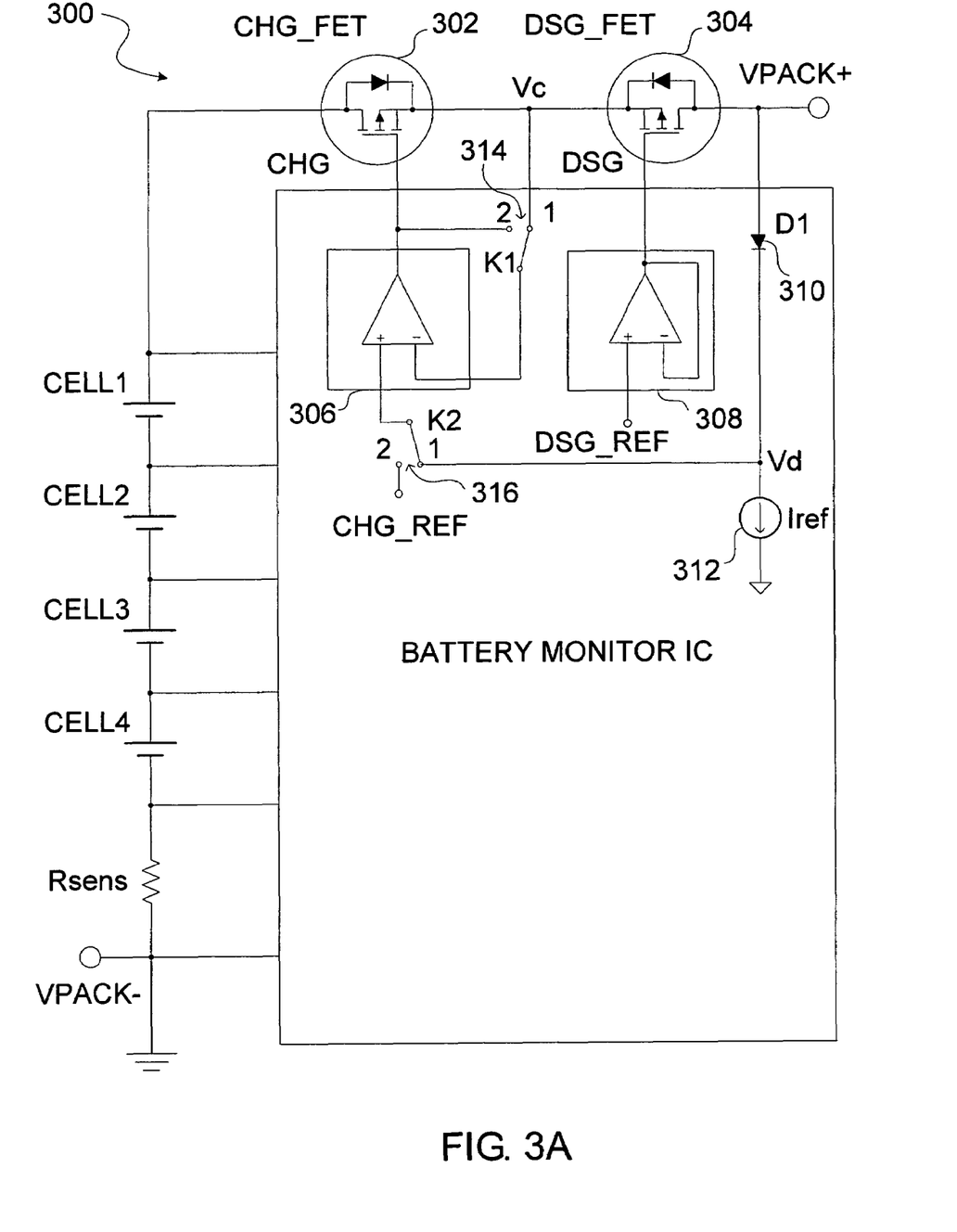
FIG. 3A is another exemplary trickle precharge topology according to the present invention.

FIG. 3A depicts another exemplary trickle precharge topology 300 according to the present invention. In this embodiment, charge FET and discharge FET may be placed face-to-face in series instead of back-to-back (as shown in FIG. 2A). The embodiment of FIG. 3A may also includes a reference diode D1 310, and in this embodiment the charge FET driver 306 may be controlled by switches K1 and K2.

In normal charge mode, switches K1 and K2 may be set to position 2, so the charge FET gate voltage is driven to CHG_REF, which may operate to fully turn on the charge FET 302. In trickle precharge mode, discharge FET 304 may be off, and K1 and K2 may be set to position 1. In this case the charge FET driver 306 may operate to regulate the charge FET 302 to force voltage Vc substantially equal to Vd. In forward bias condition, the diode D1 DC current is:

$$Iref = A1*IS1*(exp(Vd1/Vt)-1)$$

where A1 is diode D1 junction area, IS1 is diode D1 unit reverse saturation current, Vd1=VPAK+−Vd is the voltage drop across the diode D1, and Vt is diode threshold voltage.

The DC current in the body diode of discharge FET will be:

$$Ipch = A2*IS2*(exp(Vd2/Vt)-1)$$

where A2 is the body diode junction area, IS2 is the body diode unit reverse saturation current, Vd2=VPACK+−Vc is the voltage drop across discharge FET body diode.

IS1 and IS2 are determined by the type of semiconductor device chosen, as is well understood in the art.

If Vd and Vc are forced equal, then the trickle precharge current is $$Ipch = A2/A1*(IS2/IS1)*Iref.$$

Figure 3B:
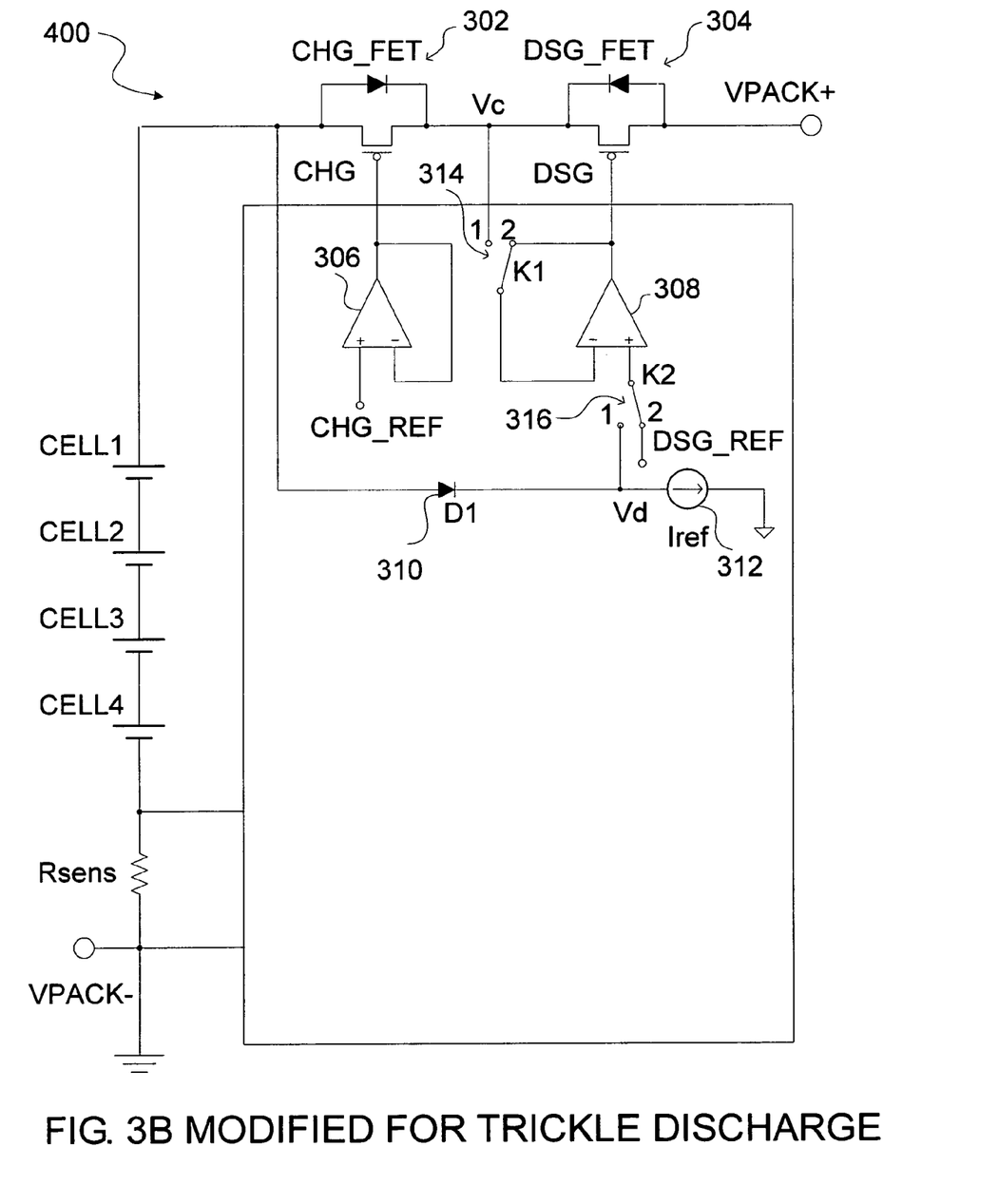
FIG. 3B is another exemplary trickle discharge topology according to the present invention.

FIG. 3B depicts one exemplary trickle discharge topology 400 according to the present invention. This embodiment is similar to the topology 300 depicted in FIG. 3A, except the reference current source 312 and the diode 310 are coupled on the discharge MOSFET 302 side. During a trickle discharge period the charge MOSFET 304 may be OFF, and discharge current may flow through the body diode. The operation of the topology 400 is otherwise described above with reference to FIG. 3A.

In order to speed up the trickle precharge process, the trickle precharge current Ipch can be readily adjusted based on the cell voltage. The higher the cell voltage, the larger the trickle precharge current is set by programming the reference current Iref. The programmable reference current source in FIG. 5 may be adapted to generate a reference current based on the cell voltage, as would be well understood in the art.

Figure 4:
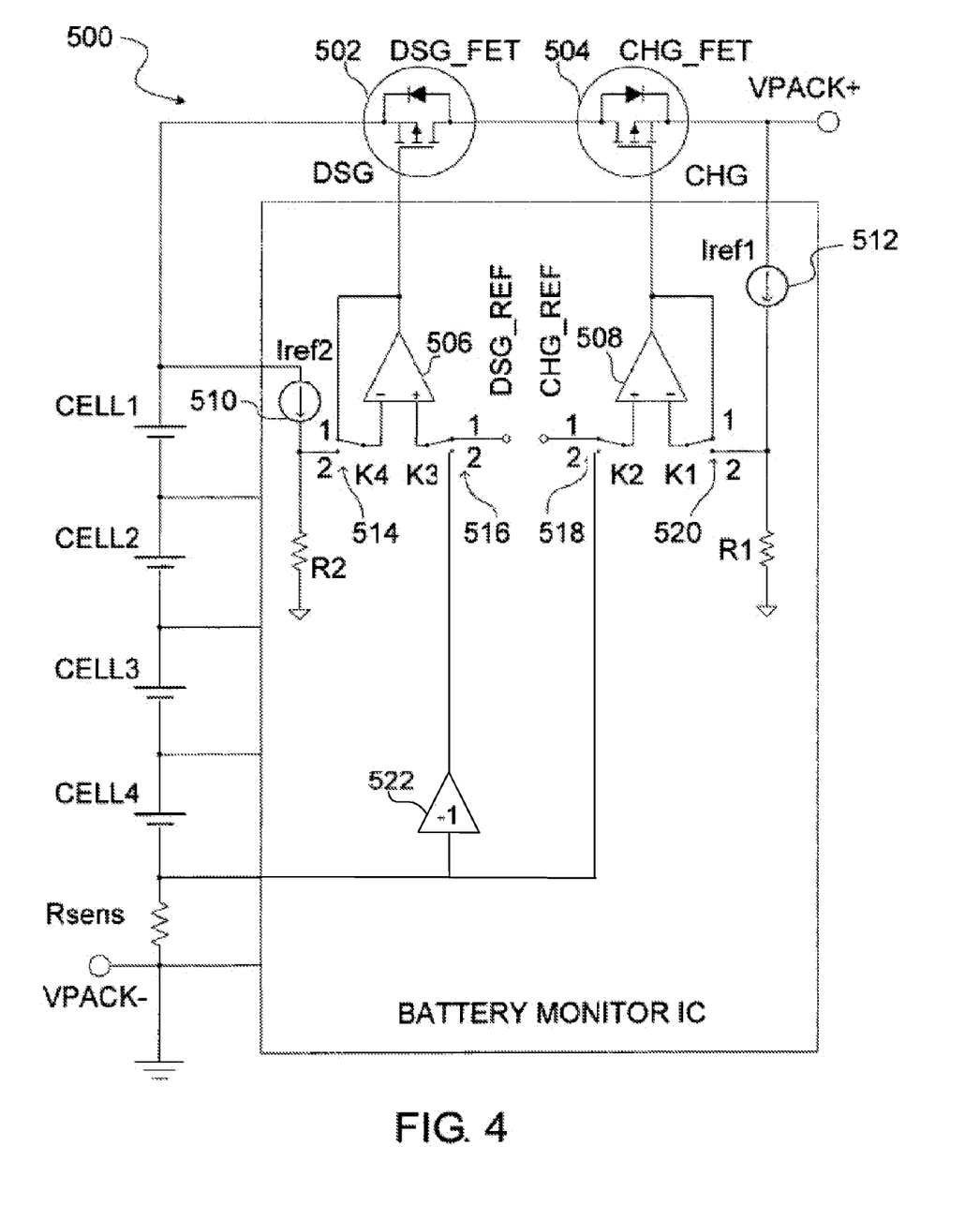
FIG. 4 is another exemplary trickle precharge topology according to the present invention.

Still another exemplary trickle precharge topology 500 is depicted in FIG. 4. In this exemplary embodiment, the charge FET 504 and discharge FET 502 may be placed back-to-back in series in the manner depicted and as understood in the art. In a trickle precharge mode, the discharge FET 502 may be off (non-conducting), but the current can still pass through its body diode to the battery cells if charge FET(CHG_FET) is on (conducting). If CHG_FET is off, then no current flows from or into the battery cells.

This embodiment may also include a reference resistor R1, discharge driver 506, charger driver 508, and reference current source Iref1 512. The charge driver 508 and discharge driver 506 may include respective differential amplifier. In a regular charge mode, switches K1 and K2 (518 and 520) may be set to position 1. In this position, the charge driving voltage CHG may be driven to a point approximately equal to a relative reference voltage CHG-REF, which may operate to fully turn on the charge FET 504. Therefore, the reference voltage CHG-REF may be selected in accordance with the turn on requirements of the charge FET device 504.

When trickle charge (i.e., trickle precharge) is needed, switches K1 and K2 may be connected to node 2. The input to the amplifier 508 in this case may be the voltage across Rsens (+) and the voltage drop across R1 (as generated by Iref1 512). The gain of the amplifier 508 may be selected to be large (e.g., >80 dB) so that the voltage drop from Iref1 across the resistor R1 will be approximately equal to the voltage drop from trickle charge current Ipch across the sense resistor Rsens.

The trickle precharge current is given by:

$$Ipch=Iref1*R1/Rsens;$$

where Iref1 is a programmable current reference source. Usually Rsens is very small (for example on the order of 10 to 20 mOhms), while R1 may be selected to be on the order of 10 Ohms. Therefore, the ratio R1 over Rsens can be very large, and thus a small reference current Iref1 can be used to generate a relatively large trickle precharge current because of large gain of R1/Rsens.

In the embodiment of FIG. 4, during trickle precharge mode, the discharge FET can be fully turned on, thereby eliminating the diode forward biasing voltage drop between VPACK+ and battery pack voltage. In this mode, switches K4 514 and K3 516 may be set to position 1 thereby driving the discharge FET with the discharge reference voltage to fully turn on the discharge FET (in a manner described above).

Still with reference to FIG. 4, in a normal discharge mode, switches K3 and K4 may be connected to node 1, respectively. In this manner, the discharge FET driver may be configured as a buffer and drive the discharge FET to fully turn on. When in trickle discharge mode, switches K3 and K4 may connect to node 2. The voltage drop from Iref2 across the resistor R2 may be approximately equal to the voltage drop across the sense resistor, Rsens, because of the high gain of the driver. So, the trickle discharge current is:

$$Idsg=Iref2*R2/Rsens$$

where Iref2 is a programmable current reference source. Usually Rsens may be very small, so the ratio R2 over Rsens can be very large, and thus a small reference current Iref2 can be used to generate relative large trickle discharge current because of large gain R2/Rsens. Because the current direction is reversed during discharge, the voltage drop across sense resistor Rsens and voltage drop across R2 may have reversed polarity. Accordingly, a polarity reversing circuit 522 may be provided to reverse the polarity of the current across Rsens.

In this embodiment, during trickle charge, the discharge FET can be fully turned on. So the diode forward biasing voltage drop is eliminated between VPACK+ and battery pack voltage. Likewise, during trickle discharge, the charge FET may be fully turned on to eliminate the diode forward biasing voltage drop between the battery pack voltage and VPACK+.

Figure 5:
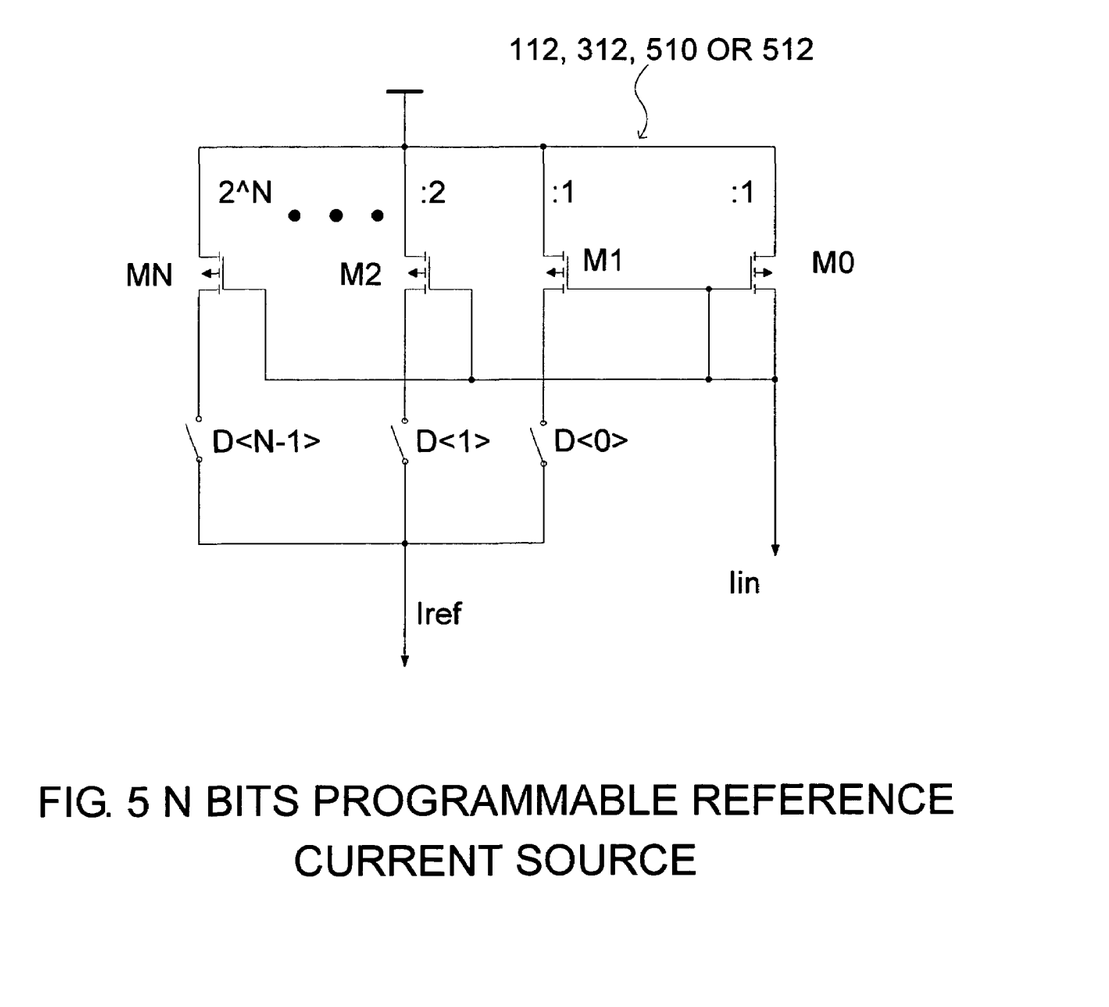
FIG. 5 is an exemplary programmable current source.

In the present invention, once the MOSFETs and the diode are fixed, Ipch can still be adjusted by the programmable current source (Iref) 112, 312, 510 and/or 512. One exemplary circuit topology for a programmable current source is depicted in FIG. 5. The circuit of FIG. 5 may be adapted to generate the current Iref with ratio d current mirrors, as is well understood in the art. Or course, programmable reference current sources are well known in the art and can be implemented in a variety of ways, in addition to the circuit of FIG. 5.

Figure 6:
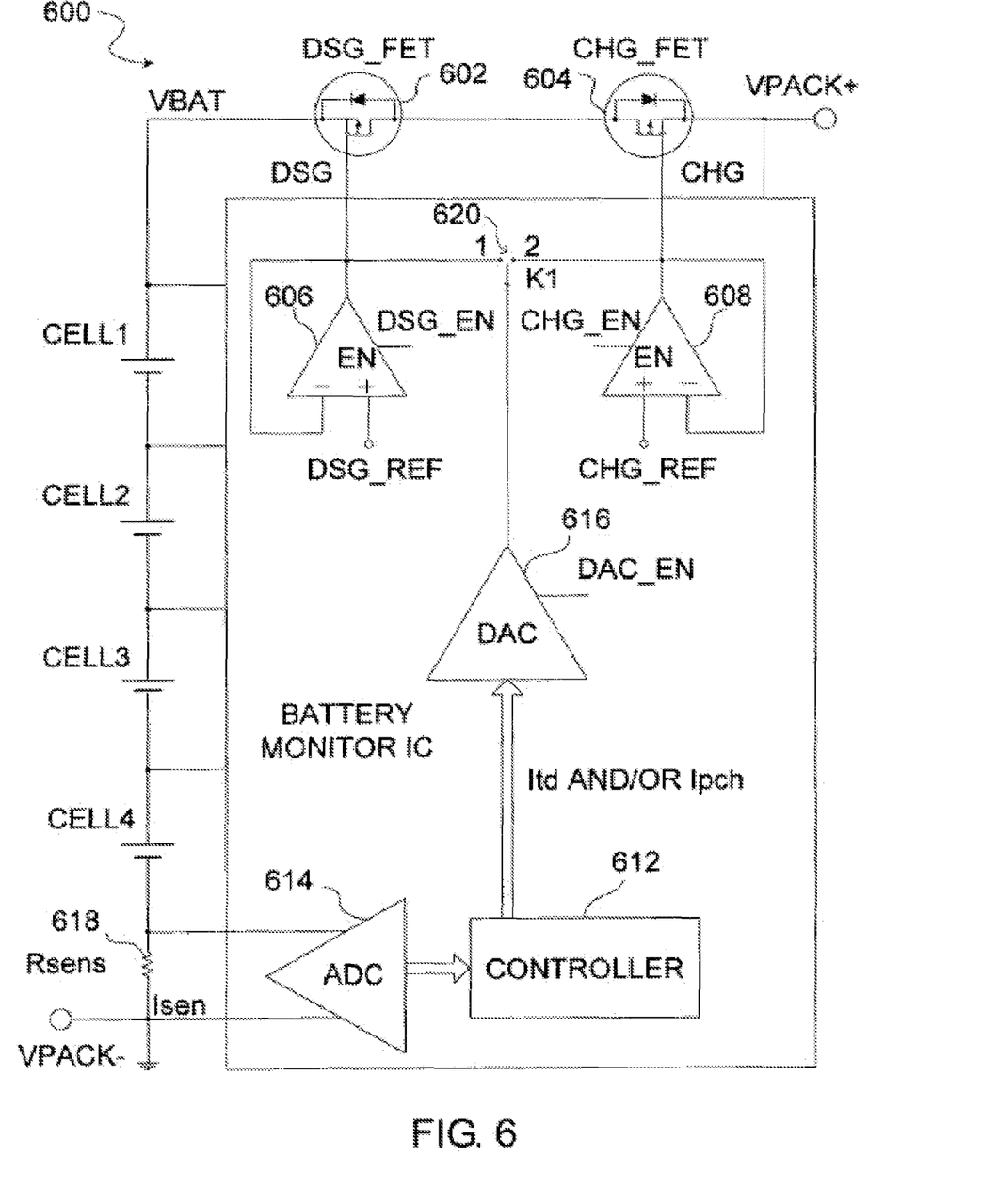
FIG. 6 is an exemplary trickle precharge and trickle discharge topology.

One exemplary trickle precharge and trickle discharge topology 600 is depicted in FIG. 6. In this embodiment, the charge FET 604 and discharge FET 602 may be placed back-to-back in series in the manner depicted and as understood in the art, or alternatively, face-to-face in series as described above. In this exemplary embodiment, a digital to analog converter circuit (DAC) 616 may be used to generate the FET driving voltages, as described more fully below.

This embodiment includes a control loop that may comprise an analog to digital converter circuit (ADC) 614, a controller 612 and a digital to analog converter circuit (DAC) 616. Current sensed across the sense resistor Rsens 618 may be received by the ADC 614. The ADC, in turn, may generate digital signals indicative of the sensed current and transmit those signals to the controller 612. In operation, if the current through the resistor Rsens 618 is smaller than a predefined threshold, the controller 612 may send data to the DAC 616 to increase the corresponding FET driving voltage. Otherwise, the controller 612 may send data to the DAC 616 to decrease the FET driving voltage until the difference between the sensed current and predefined current is approximately equal. These operational characteristics of this embodiment are described more fully below.

In normal charge or discharge mode, the DAC 616 may be disabled, and the charge FET 604 and discharge FET 602 are conducting. In this embodiment, DAC 616 may be capable of being controllably enabled and/or disabled, for example, by utilizing a DAC_EN signal as depicted. The charge FET driver 608 may drive the gate of charge FET 604 to a CHG_REF value, which may fully turn on the charge FET 604. The discharge FET driver 606 may drive the gate of discharge FET 602 to a DSG_REF value, which may fully turn on the discharge FET 602. Charge FET driver 608 and discharge FET driver 606 may be controllably enabled and/or disabled, for example, utilizing a CHG_EN and DSG_EN signal, respectively.

In a trickle discharge mode, switch K1 (620) may be connected to node 1. The discharge driver 606 may be disabled (e.g., DSG_EN is low) which may operate to produce a high impedance on the output of the discharge driver 606. The conduction state of the discharge FET 602 may be controlled by the DAC 616 and controller 612. Thus, the discharge FET 602, sense resistor Rsens 618, the ADC 614, the controller 612 and the DAC 616 may comprise the control loop. By controlling the turn on resistance of the discharge FET 602, the present embodiment may be capable of adjusting a trickle discharge current to a desired value, as may be preprogrammed into the controller. As described above in the previous embodiments, the turn on resistance of the discharge FET 602 can be adjusted by adjusting its gate driving voltage.

Controller 612 may comprise circuitry to control the operation of DAC 616. As used in any embodiment herein, "circuitry" may comprise, for example, singly or in any combination, hardwired circuitry, programmable circuitry, state machine circuitry, and/or firmware that stores instructions executed by programmable circuitry. Controller 612 may comprise one or more integrated circuits. As used in any embodiment herein, an "integrated circuit" means a semiconductor device and/or microelectronic device, such as, for example, a semiconductor integrated circuit chip. Although not shown in FIG. 6, this embodiment may also comprise memory which may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively, memory may comprise other and/or later-developed types of computer-readable memory. Machine-readable firmware program instructions may be stored in memory. As described below, these instructions may be accessed and executed by controller 612, and these instructions may result in controller 612 performing the operations described herein as being performed by controller 612 and/or other circuitry which may be comprised in this embodiment.

In this embodiment, controller 612 may be capable of generating one or more data bits representing a desired trickle discharge current value Idt. To that end, controller 612 may be capable of performing successive and/or recursive operations to achieve a desired trickle discharge current based on actual current as may be sensed across Rsens 618. For example, if the desired trickle discharge current is set to Itd, controller 612 may be capable of performing a successive approximation register (SAR) method to generate the appropriate data bits. The SAR method may comprise initially setting the DAC MSB (most significant bit) to high, and then measuring the current across Rsense 618. If the current through the sense resistor 618 (Isen) is larger than Itd, then controller 612 may set the DAC MSB to low, otherwise controller 612 may keep the DAC MSB high. Controller 612 may then set the second MSB bit high and then measure the current through Rsens. If Itd<Isen, the second MSB may be set low, otherwise this bit may be high. This successive approximation may continue until DAC LSB is set. Accordingly, executable instructions may be stored in memory (not shown), and controller 612 may access those instructions to perform operations, for example the SAR method. If Itd is fixed for a given battery pack, then the instructions stored in memory may also be fixed. Whenever trickle discharge is needed, the controller 612 may be capable of controlling the DAC 616 to generate a desired trickle discharge, and thus, the battery pack may be capable of delivering Itd to an external load. The control code that generates the appropriate trickle discharge current may be saved in memory, and may be assessed by controller 612 for subsequent trickle discharge operations. If the trickle discharge current needs to be adjusted, the control loop described herein may be used to increase or decrease the Itd accordingly. During trickle discharge mode, the charge driver 608 can be enabled or disabled. The difference is that the trickle discharge current will flow through the charge FET or through its body diode respectively.

In a trickle charge mode, switch K1 is connected to node 2. The charge driver 608 may be disabled (CHG_EN is low). The conduction state of the charge FET 604 may be controlled by the DAC 616 and controller 612. In this mode, the charge FET 604, sense resistor Rsens 618, the ADC 614, the controller 612 and the DAC 616 may comprise the control loop. By controlling the turn on resistance of the charge FET 604, the present embodiment may be capable of adjusting the trickle charge current to a desired value. Precharge current is often a fixed value. In this mode, the present embodiment may generate Ipch, using for example the above-mentioned SAR method, and save this control code in the memory. For trickle precharge current, the value may vary in a range from high limit to low limit, and thus, the control code may be adapted to vary Ipch between a high and low range, thus permitting the trickle charge current to be adjusted accordingly. During trickle charge mode, the discharge driver 606 can also be enabled or disabled. The difference is that the trickle charge current will flow through the discharge FET or through its body diode, respectively.

From FIG. 1A, we know that during the precharge period and constant voltage (CV) charge period, the charge current may need to be controlled. In conventional circuits, an additional precharge FET is needed to control the precharge current. In such a conventional circuit, the CV charge must fully rely on the charger to accurately regulate the charge voltage to Vov, then the charge current will taper.

In the present invention, the precharge function can be implemented without the extra pre-charge FET. Furthermore, in order to speed up the precharge process, the pre-charge current Ipch can be easily adjusted based on the cell voltage. The higher the cell voltage, the larger the pre-charge current may be supplied by programming the reference current Iref, such as described herein with reference to FIG. 2A, FIG. 3A and FIG. 4, or the control loop approach described in FIG. 6.

Advantageously, trickle precharge current control, as described in numerous embodiments herein, can be utilized during a CV time period where trickle precharge circuitry may be capable of generating a trickle charge current based on the cell voltage. In this manner, the CV charge current taper does not need to rely on the charger regulated voltage Vov. Therefore, advantageously, the present disclosure provides several embodiments which may obviate the need for an expensive, accurate voltage regulation charger. Indeed, a simple AC adapter can be used to charge the lithium ion battery. Because in CV charge period, even the charger cannot hold the constant voltage to Vov, but the charge current is limited to the pre-programmed trickle current value, which is determined based on the cell voltage. So, over charging won't happen. This charge current limitation can be used as a secondary over-voltage protection (by setting the current limit slightly above the actual observed current for the desired $V_{OV}$, and/or as the primary over-voltage protection (by regulating the charge current until the exact desired $V_{OV}$ is obtained).

Also advantageously trickle discharge according to the present invention may provide better short-circuit protection for the battery pack. In conventional battery packs, the discharge FET can either fully turn on to allow discharge or fully turn off to disable discharge. When the battery pack is out of the system, for example, put on the shelf, then the discharge FET may be kept ON to prepare for powering the system anytime that the battery pack may plugged into the system. In this case, if something abnormal happens, such as a VPACK+ terminal short, a huge current may be drawn from the battery, which in turn will damage the battery. Alternatively, in conventional battery packs, the discharge FET may be kept OFF to protect the battery from short-circuit condition. But this will prevent the battery to power the system when the battery pack is plugged into the system. To overcome this difficulty, some conventional battery packs may provide a mechanical method to inform the battery back to turn on the discharge FET. This may cause inconvenient to the customer, and may also increase the price and/or size of the battery pack. According to at least one embodiment described herein, the battery pack may be placed in a trickle discharge mode when the battery is out of the system. The trickle discharge current value can be chosen to be large enough, for example 100 mA, to power the system embedded controller when the battery pack is plugged into the system. Then the system embedded controller will detect that the battery is present and inform the battery to operate in a normal discharge mode. With the discharge FET limiting the current to predetermined trickle discharge value, for example 100 mA, even during a VPACK+ short, a high current surge may be prevented.

The trickle discharge and trickle charge topologies described herein may also be utilized in multiple battery systems. When multiple battery packs discharge simultaneously, they can provide more power to the system. This may also decrease the internal impedance of the battery because multiple battery packs may be coupled together in parallel to increase efficiency. However, stringent regulations may require that if multiple battery packs discharge simultaneously, those multiple batteries must have exactly the same voltage. Otherwise, even if two battery packs have very small voltage difference (for example 10 mV) because of the very small resistance of power bus coupled to the battery (for example 2 milliohm) then a large current (5 amperes in this example) may flow from the higher voltage battery pack into the lower voltage battery pack.

In practice, it is difficult to maintain multiple battery packs to have the same voltage, also it very hard to determine if the two battery packs are at the same voltage even with a very accurate ADC to monitor the battery voltage, because the battery pack voltage may vary with the discharge current. Trickle discharge operations, as described herein with reference to numerous embodiments, may be capable of solving multiple battery pack issues. As an example, a system may comprise two battery packs, Pack A and Pack B. Assume that initially Pack A voltage is higher than Pack B.

Pack A may discharge first to power the system, and the voltage of Pack A drops gradually. The discharge FET of Pack B may be OFF to disable discharge of Pack B. When Pack A voltage drops to the same as Pack B voltage, the present invention can set Pack B either in trickle charge mode or in trickle discharge mode. If Pack B is enabled in trickle charge mode, the discharge FET may be fully turned on, and the charge FET may be controlled to operate in a saturation conduction range. In this manner, the charge FET may be used as a current limit resistor. If Pack B is enabled in trickle discharge mode, the charge FET may be fully turned on, and the discharge FET may be controlled to operate in a saturation conduction range. In this manner, the discharge FET may be used as a current limit resistor. For added safety, and referring to the topology 600 of FIG. 6, the trickle charge operations and/or trickle discharge operations may be set controlled to produce a relatively small current value by operating the charge FET and discharge FET in a saturation conduction range to increase the equivalent resistance of the charge FET and/or the discharge FET.

In the preceding example, because Pack A is discharging and Pack B is idle, the actual Pack A voltage will be higher than pack B voltage even though their measured voltage value may be equal. If this happens, Pack A may charge Pack B. However, the charge current is limited by the resistance of the charge FET (if we put pack B in trickle charge mode) or the discharge FET (if we put pack B in trickle discharge mode). The limited current is determined by, for example, the control code executed by controller 612.

In the present invention, this charging current may be monitored by the ADC comprised in Pack B. As the voltage difference between pack A and pack B get reduces, the charge current from pack A to pack B also reduces. When the charge current is smaller than a predetermined value, for example 10 mA, the controller may switch Pack B from a trickle charge mode or trickle discharge mode to a fully discharge mode.

Accordingly, there has been disclosed programmable trickle precharge and/or trickle discharge circuitry and methodology that provides more flexibility, fewer components, and higher efficiency to finish precharging as compared with a conventional topology. It should be understood that the switches (K1, K2 and/or K3 and K4) may be controlled by the battery monitor IC to put the programmable trickle charge circuits of at least one embodiment described herein into a trickle precharge mode or a normal charge mode based on the level of charge on the battery cells (deeply discharged requires a trickle charge mode). It should be further understood that the topologies depicted herein may be implemented using discrete components and/or integrated into an IC and/or a combination of both.

The present invention may be adapted for any portable electronic device (portable computer, cell phone, PDA, etc.) that uses rechargeable batteries. To that end, the topologies depicted herein may be integrated into a battery pack for a portable electronic device. "Battery pack", as used herein, may be defined as a battery comprising at least one battery cell. A battery pack may comprise one or more rechargeable lithium ion cells. A battery pack may also comprise one or more electronic components, such as depicted and described herein to facilitate controllable charging and/or discharging and/or operation of the battery pack.

Those skilled in the art will recognize numerous modifications which may be made without departing from the spirit and scope of the present disclosure, only as limited by the claims.

What is claimed is:

1. An apparatus comprising:

a switch; and switch control circuitry configured to control said switch in a full conduction state and a controllable conduction state, said switch control circuitry is configured to control said switch in said controllable conduction state by comparing an output voltage of said switch to a reference voltage and generating a control signal capable of controlling said conduction state of said switch, said switch control circuitry is further configured to force said output voltage of said switch to approximately equal said reference voltage and to provide a gain to said control signal to cause said switch to operate in a saturation region.

2. The apparatus of claim 1, wherein said switch comprises a charge switch to control charge current to a battery, wherein when a charge state of said battery is below a threshold charge, said switch control circuitry controls said switch in said controllable conduction state thereby allowing a trickle charge current to flow from a power source to said battery.

3. The apparatus of claim 2, wherein when said charge state of said battery is above said threshold charge, said switch control circuitry controls said switch in said full conduction state thereby allowing a full charge current to flow from said power source to said battery, said full charge current being greater than said trickle charge current.

4. The apparatus of claim 1, wherein said switch comprises a discharge switch to control discharge current provided from an associated battery, wherein when said battery experiences a discharge fault condition said switch control circuitry controls said switch in said controllable conduction state thereby allowing a trickle discharge current to flow from said battery.

5. The apparatus of claim 4, wherein in an absence of said fault condition said switch control circuitry controls said switch in said full conduction state thereby allowing a full discharge current to flow from said battery, said full discharge current being greater than said trickle discharge current.

6. The apparatus of claim 4, wherein said battery experiences said fault condition if a discharging current level provided by said battery is greater than a fault current threshold.

7. A system, comprising:
a battery pack comprising at least one rechargeable battery cell;
a switch; and
switch control circuitry configured to control said switch in a full conduction state and a controllable conduction state, said switch control circuitry is configured to control said switch in said controllable conduction state by comparing an output voltage of said switch to a reference voltage and generating a control signal capable of controlling said conduction state of said switch, said sensed condition, said switch control circuitry is further configured to force said output voltage of said switch to approximately equal said reference voltage and to provide a gain to said control signal to cause said switch to operate in a saturation region.

8. The system of claim 7, wherein said switch comprises a charge switch to control charge current to said at least one battery cell, wherein when a charge state of said at least one battery cell is below a threshold charge, said switch control circuitry controls said switch in said controllable conduction state thereby allowing a trickle charge current to flow from a power source to said at least one battery cell.

9. The system of claim 8, wherein when said charge state of said at least one battery cell is above said threshold charge, said switch control circuitry controls said switch in said full conduction state thereby allowing a full charge current to flow from said power source to said at least one battery cell, said full charge current being greater than said trickle charge current.

10. The system of claim 7, wherein said switch comprises a discharge switch to control discharge current provided from said at least one battery cell, wherein when said battery experiences a discharge fault condition said switch control circuitry controls said switch in said controllable conduction state thereby allowing a trickle discharge current to flow from said at least one battery cell.

11. The system of claim 10, wherein in an absence of said fault condition said switch control circuitry controls said switch in said full conduction state thereby allowing a full discharge current to flow from said at least one battery cell, said full discharge current being greater than said trickle discharge current.

12. The system of claim 10, wherein said at least one battery cell experiences said fault condition if a discharging current level provided by said battery is greater than a fault current threshold.

13. A method, comprising:
providing a switch;
providing a battery;
controlling the conduction state of said switch comprising:
a) comparing an output voltage of said switch to a reference voltage;
b) generating a control signal capable of controlling said conduction state of said switch;
c) forcing said output voltage of said switch to be approximately equal to said reference voltage; and
d) providing a gain of said control signal to cause said switch to operate in a saturation region.

14. The method of claim 13, further comprising:
controlling the conduction state of said switch to operate in said saturation region to permit said battery to generate a controllable trickle discharge current.

15. The method of claim 13, further comprising:
controlling the conduction state of a said switch to operate in said saturation region to permit said battery to receive a controllable trickle charge current.

* * * * *